United States Patent [19]

deVries

[11] 4,416,861

[45] Nov. 22, 1983

[54] TWO STAGE ODOR CONTROL SYSTEM

[75] Inventor: Egbert deVries, Kettering, Ohio

[73] Assignee: Quad Environmental Technologies Corp., Highland Park, Ill.

[21] Appl. No.: 373,250

[22] Filed: Apr. 29, 1982

[51] Int. Cl.³ .............................................. B01D 53/34
[52] U.S. Cl. .................................... 423/210; 423/224; 423/245; 55/94; 422/4; 422/5
[58] Field of Search ....................... 423/210, 224, 245; 55/84, 94; 422/4, 5

[56] References Cited

U.S. PATENT DOCUMENTS

| | | | |
|---|---|---|---|
| 4,125,589 | 11/1978 | deVries | 423/245 |
| 4,141,702 | 2/1979 | deVries | 55/94 |
| 4,225,566 | 9/1980 | deVries | 423/210 |
| 4,238,461 | 12/1980 | deVries | 423/210 |

*Primary Examiner*—Earl C. Thomas

[57] ABSTRACT

Odoriferous vapors, such as those from plants for rendering fats, for example, are treated in a two-chamber system. Vapors having a high odor content, such as those from rendering cookers and presses, enter a first high intensity odor treatment chamber at the top, and are treated with a water spray or sprays, the latter containing an oxidant, NaOCl, for example, or $H_2SO_4$, at a relatively high concentration of liquid droplets per cubic foot and a relatively longer reaction time in the order of 20 seconds. Treated vapors exit this chamber from its lower portion and are led into a duct conveying low odor intensity vapors, such as rendering plant ventilation odors, into a second, lower intensity odor treatment chamber. The second chamber contains a spray nozzle which sprays water droplets of lesser concentration into the vapors, the said droplets also containing a treating agent. In the second chamber the reaction time is relatively shorter in the order of about three seconds. Treated vapors substantially odor-free are removed from the top of the second chamber.

20 Claims, 2 Drawing Figures

TWO STAGE ODOR CONTROL SYSTEM

BACKGROUND OF THE INVENTION

The offensive odors given off by rendering plants constitute a problem of long standing and many systems have been proposed to remedy this. A number of these prior art proposals are noted in the U.S. Pat. No. 4,141,702, to deVries, which is incorporated by reference in this application.

U.S. Pat. No. 4,141,702 describes a process for treating offensive vapors by an aqueous spray treatment, the spray droplets being a very small diameter and containing a water soluble oxidizing agent. This system is quite effective in the treatment of vapors having high intensity odor constituents. It has been found that where a processing plant produces vapors having high intensity or concentrated odor constituents and vapors having low intensity or dilute odor constituents, better results are obtained by treating them separately employing different reaction conditions tailored to produce optimum results with each category.

One proposal is to provide two reaction chambers, with the high odor intensity vapor entering into the upper part of a high intensity odor chamber treating zone where it is subjected to a spray treatment. The treated vapor exits the lower portion of the chamber and joins the untreated low intensity odor vapors. The mixed vapors are then led to the upper portion of a low intensity treatment chamber where they are subjected to a fine aqueous spray treatment to remove the odor constituents, and the purified vapors exit via an exhaust stack from the lower portion of the low intensity vapor treatment chamber.

While this configuration provides for the separate treatment of the high and low odor vapors, it is an awkward and unnecessarily complex arrangement. The present invention provides for a simple and more efficient design resulting in improved results and lower cost in construction and operation.

Among the objects of the present invention are:

To provide an improved two-stage system for treating separate vapors produced during any manufacturing or treatment process, such as a processing plant, for example, consisting of high intensity odor-containing vapors and low intensity odor-containing vapors;

to admit the high intensity odor-containing vapors into the upper portion of a treating chamber or tower and subjecting them to an aqueous spray treatment for a relatively long time to remove the odor components;

to incorporate into the aqueous spray an oxidant or acid or bases or suitable mixtures thereof, such as NaOCl or $H_2SO_4$;

to treat the vapors with a multiple aqueous spray system, in a treating tower, each spray containing a different reagent;

to treat the vapors with a dual aqueous spray system in a treating tower, wherein one spray comprises NaOCl and the other spray comprises $H_2SO_4$;

to mix the treated vapors from the high intensity odor treatment tower with untreated low intensity odor-containing vapors and leading the mixture of vapors into the bottom of a low intensity odor treating tower;

to subject the mixed vapors to an aqueous spray treatment adjacent the place of entry of the vapors into the low intensity odor treating tower for a relatively shorter time to remove the odor constituents and to remove the treated vapors from the top portion of the tower.

Further objects will become apparent from the specification and claims which follow.

SUMMARY OF THE INVENTION

The method of this invention treats the high intensity odor-containing vapors and low intensity odor-containing vapors emanating from a processing plant, or any other plant which produces offensive odors, in two treating towers. The high intensity odor-containing vapors are led into the upper part of a first treatment tower, are treated with aqueous spray(s) containing reactive chemical(s), e.g., an oxidant such as NaOCl, or $H_2SO_4$ and withdrawn from the bottom of the first treating tower. The treated vapors, admixed with low intensity odor-containing vapors, are admitted into the bottom of a second treatment tower after being subject to an aqueous spray treatment similar to the first treatment, but with a shorter reaction time and lower droplet concentration. Treated vapors are removed from the top portion of the second treating tower.

DESCRIPTION OF THE PREFERRED EMBODIMENT

Figure 1:
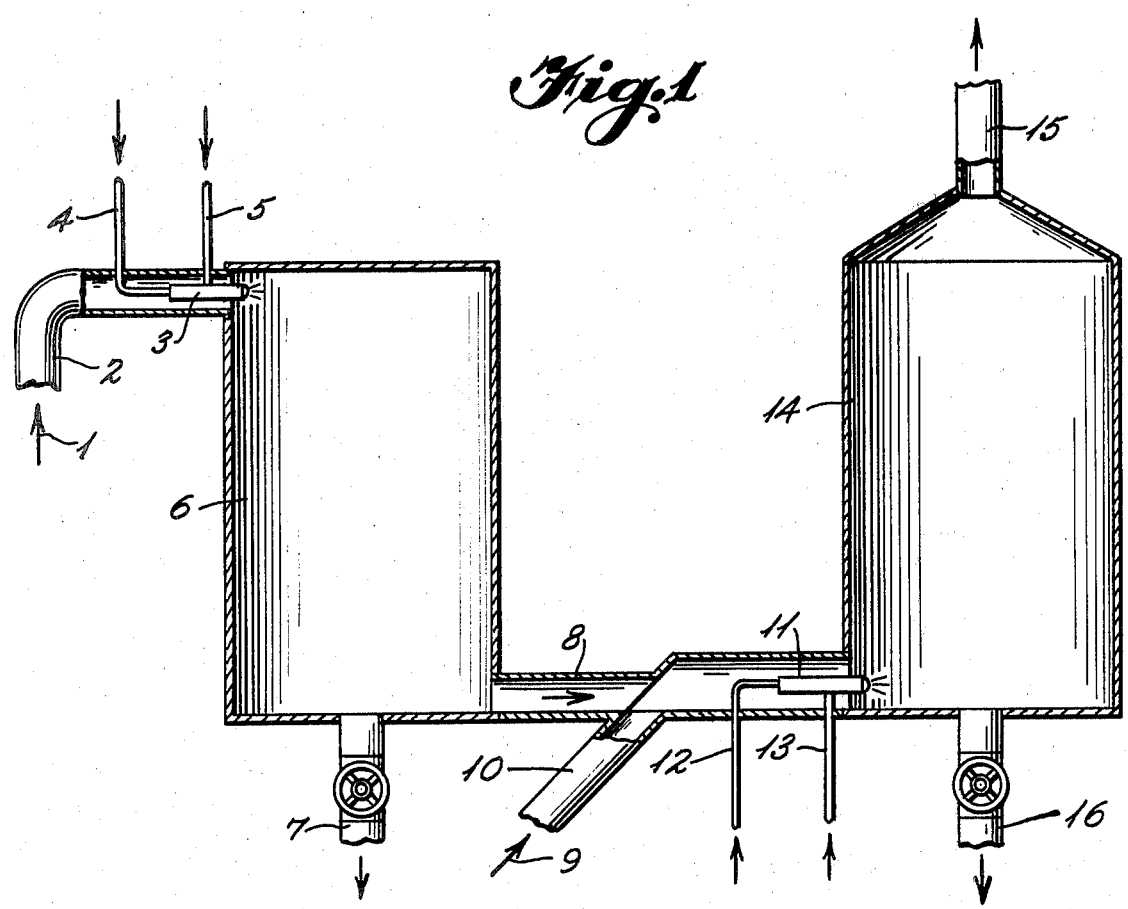
FIG. 1 is a sectional view of one embodiment of the invention.

In FIG. 1, high intensity or concentrated odor-containing vapors 1 having 5,000 and more odor units, such as press odors or the non-condensables from a cooker in a fat rendering process, are admitted via a line or duct 2 to a treating tower 6 at a flow rate generally in the order of 1,000–5,000 cfm, although flow rates higher or lower may be employed in certain cases. Located at the top of tower 6 is a plurality of spray nozzles, only one being shown at 3, having a compressed air line 4 and a water line 5. The spray nozzle is preferably of the ultrasonic type in order to deliver droplets of a very small diameter, as discussed in U.S. Pat. No. 4,125,589. Preferably, the water employed in the spray has dissolved therein a chemical reactant for the odor constituents which serves to remove them. Usually an oxidant is employed such as NaOCl, although $H_2SO_4$ also is frequently employed. Other reactants, acids or bases may be substituted depending on the particular odor problems presented.

The concentration of NaOCl and the other chemical treating agents may vary from 10 ppm to 50,000 ppm with a narrower preferred range of 500 to 2,000 ppm with 1,000 ppm being the preferred concentration. The preferred size of the spray droplets is up to 10 microns in diameter. In first treatment tower 6, the water flow rate in the spray nozzles may range from 0.5 to 1 gal/min to yield $6 \times 10^6$ to $1 \times 10^9$ droplets per cfm in the tower, having a diameter range of 5 to 20 microns. The reaction or residence time is on the order of about 10 to 60 seconds, with a preferred residence time of 20 seconds. Liquid drains from tower 6 via line 7 and treated vapors exit via line 8.

Low intensity or concentration odor-containing vapors 9, having less than 5000 odor units, enter duct 10 at a flow rate of 10,000–100,000 cfm. Treated vapors from line 8 enter duct 10 and comingle with vapors 9 in the duct at the bottom of tower 14 and flow past one or more spray nozzles. One nozzle is shown at 11 with a compressed air line 12 and a water line 13. Spray nozzle 11 is similar in design to spray nozzle 3. The nozzle liquid flow rate may range from 1 to 2 gal/min to yield $1\times10^8$ to $1\times10^9$ droplets per cfm, having a diameter of 5 to 20 microns. The reaction time in tower 14 is on the order of about 2 to 5 seconds with about 3 seconds preferred. As shown in the Figure, the vapors enter treatment tower 14 at the bottom and travel upward through a mist of spray droplets to exit at 15. Liquid is drained from the tower at 16. The odor removal of the intense odors is generally about 99% and of the dilute odors about 90%, but is determined by the concentrations and types of odor, and the concentrations and types of reactants.

Although the method is described with particular reference to a fat rendering plant, it is obvious that it can be employed to treat offensive vapors emanating from other type plants, such as garbage, waste treatment or chemical process plants and the like. While the above description shows the odor treatment with sprays having one composition, it is apparent that sprays having differing compositions may be introduced into the treating towers through separate spray nozzles, as described in U.S. Pat. No. 4,225,566, herein incorporated by reference.

Figure 2:
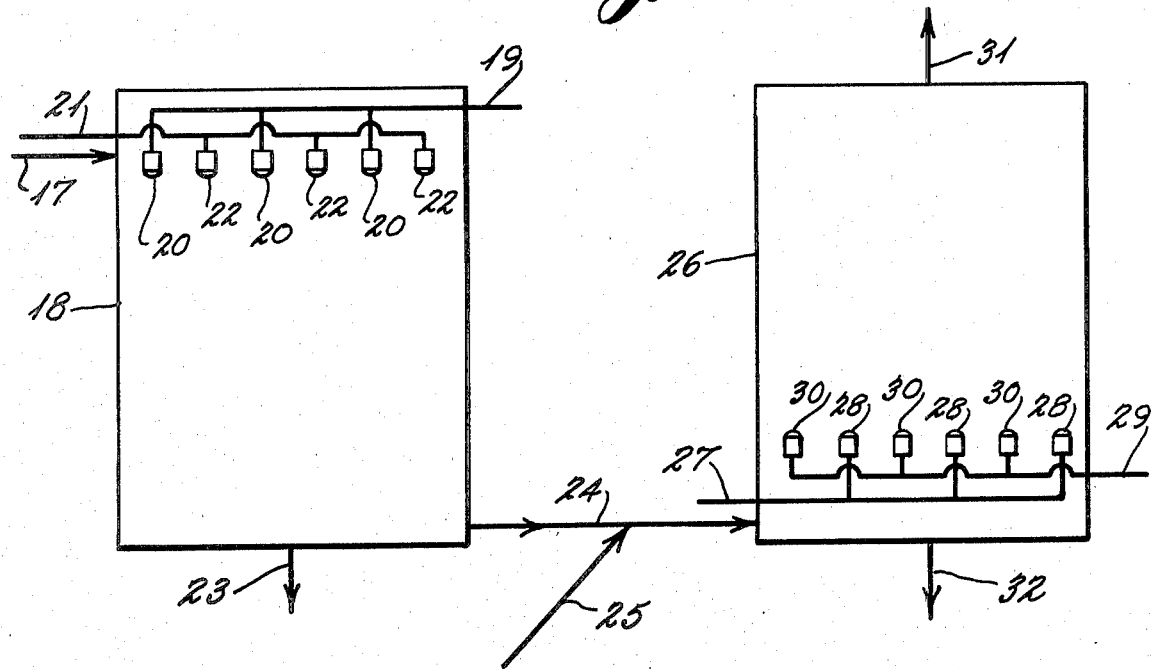
FIG. 2 is a schematic flow sheet of another embodiment of the process.

FIG. 2 shows this mode of treatment. Low intensity odor vapors enter tower 18 via line 17. One reagent solution is introduced into the chamber via line 19 and spray nozzles 20. Another reagent solution is introduced via line 21 and spray nozzles 22. As stated in U.S. Pat. No. 4,225,566, a wide variety of liquid reagents including chemically incompatible ones may be introduced via the spray nozzles into the treatment tower. In this embodiment, one combination of reagents found particularly useful consists of aqueous NaOCl introduced via one line and aqueous $H_2SO_4$ through the other.

Any commercially available nozzle may be employed which is capable of producing the fine spray required in the process, as well as the nozzle of FIG. 1. Suitable nozzles are referred to in prior U.S. Pat. No. 4,225,566.

Liquids are removed via line 23 and the treated low intensity odor vapors exit treating tower 18 via line 24, mingle with high intensity odor vapors introduced via line 25 and the combined vapors enter tower 26. They flow upward in the tower through a spray of reagents introduced via line 27 and 29 and spray nozzles 28 and 30. Here, too, the sprays may be aqueous NaOCl and $H_2SO_4$, but it is apparent that other reagents may be employed if desired and as required by specific odor problems. The treated vapors, now essentially odor free, are removed via line 31 and liquid via line 32.

The reaction times, droplet sizes and flow rates in this embodiment are substantially the same as those in the embodiment shown in FIG. 1.

I claim:

1. A method for treating vapors arising out of process operations containing offensive or foul smelling odor constituents,
   some of said vapors being of high intensity or concentrated odors and the remainder being of low intensity or dilute odors,
   conveying the high intensity odor vapors into the upper portion of a first treatment zone,
   treating the high intensity odor vapors with at least one first aqueous spray for a time sufficient to remove the odor constituents from said vapors,
   the first aqueous spray comprising droplets in the range of 5 to 20 microns in diameter and having a flow rate in the range of 0.5 to 1 gal/min to produce $6\times10^6$ to $1\times10^9$ droplets per cfm,
   removing aqueous liquid from the bottom of the first treatment zone,
   removing treated first vapors from the lower portion of the first treatment zone,
   combining the treated first vapors with the low intensity odor vapors,
   introducing the combined vapors into the lower portion of a second treatment zone via an inlet,
   contacting said combined vapors near the inlet with at least one second aqueous spray,
   treating the combined vapors in the second zone with said spray for a time sufficient to remove the odor constituents,
   the second aqueous spray comprising droplets in the range of 5 to 20 microns in diameter and having a flow rate in the range of 1 to 2 gal/min to produce $1\times10^8$ to $1\times10^9$ droplets per cfm,
   removing liquid from the bottom of the treatment zone, and
   removing the treated combined vapors from the top portion of the second treatment zone.

2. The method of claim 1 comprising:
   exiting the treated first vapors from the lower portion of first treating zone via first conduit means,
   conveying the low intensity odor vapors via second conduit means,
   mixing the treated first vapors and the low intensity odor vapors by joining the said first and second conduit means at a junction whereby the vapors commingle, causing the mixed vapors to flow through the second conduit means to the lower portion of the second treatment zone,
   and spraying the mixed vapors with said at least one second aqueous spray at the said lower portion.

3. The method of claim 1 wherein the aqueous spray comprises an aqueous solution of a treating agent selected from the group consisting of oxidizing agents, acids and bases.

4. The method of claim 3 wherein the treating agent is NaOCl.

5. The method of claim 3 wherein the treating agent is $H_2SO_4$.

6. The method of claim 3 wherein the reaction time in the first treatment zone is in the order of about 10 to about 60 seconds.

7. The method of claim 1 wherein the reaction time is in the order of about 20 seconds.

8. The method of claim 3 wherein the reaction time in the second treatment zone is in the order of about 2 to about 5 seconds.

9. The method of claim 8 wherein the reaction time is in the order of about 3 seconds.

10. The method of claim 4 wherein the reaction time in the first treatment zone is in the order of about 10 to about 60 seconds.

11. The method of claim 4 wherein the reaction time in the second treatment zone is in the order of about 2 to about 5 seconds.

12. The method of claim 11 wherein the reaction time is in the order of about 3 seconds.

13. The method of claim 4 or 5 wherein the reaction time in the first treatment zone is in the order of about 20 seconds and in the second treatment zone is in the order of about 3 seconds.

14. The method of claim 3 wherein the vapors in both the first and second treating zones are treated with sprays of different treating agents selected from said group.

15. The method of claim 14 wherein the treating agents are NaOCl and $H_2SO_4$.

16. The method of claim 15 wherein the reaction time in the first treatment zone is in the order of about 10 to about 60 seconds.

17. The method of claim 16 wherein the reaction in the first treatment zone is in the order of about 20 seconds.

18. The method of claim 15 wherein the reaction time in the second treatment zone is in the order of about 2 to about 5 seconds.

19. The method of claim 18 wherein the reaction time in the second treatment zone is in the order of about 3 seconds.

20. The method of claim 17 wherein the reaction time in the second treatment zone is in the order of about 3 seconds.

* * * * *